United States Patent [19]

Satomura et al.

[11] Patent Number: 4,644,377
[45] Date of Patent: Feb. 17, 1987

[54] FLUORAN DERIVATIVES AND RECORDING MATERIAL USING THE SAME

[75] Inventors: Masato Satomura, Kanagawa; Akira Igarashi, Shizuoka; Ken Iwakura, Kanagawa, all of Japan

[73] Assignee: Fuji Photo Film Co., Ltd., Kanagawa, Japan

[21] Appl. No.: 599,361

[22] Filed: Apr. 12, 1984

[30] Foreign Application Priority Data

Apr. 12, 1983 [JP] Japan .................................. 58-64036

[51] Int. Cl.$^4$ ........................ B41M 5/16; B41M 5/18; B41M 5/20; B41M 5/22
[52] U.S. Cl. .................................. 346/221; 427/151; 346/200
[58] Field of Search ............... 346/221, 214, 215, 217; 427/150, 151, 157

[56] References Cited

U.S. PATENT DOCUMENTS

Re. 29,427 10/1977 Sekine .............................. 346/135.1
4,226,912 10/1980 Iwasaki et al. ...................... 427/151

FOREIGN PATENT DOCUMENTS

0202348 12/1982 Japan .................................. 346/221

*Primary Examiner*—Bruce H. Hess
*Attorney, Agent, or Firm*—Sughrue, Mion, Zinn, Macpeak, and Seas

[57] ABSTRACT

A fluoran derivative with an arylamino group at the 2-position of the fluoran ring, a long-chain alkyl group at the 3-position of the fluoran ring and an amine residue at the 6-position of the fluoran ring, which can be effectively employed as a dye precursor in black color-forming type recording materials.

5 Claims, No Drawings

FLUORAN DERIVATIVES AND RECORDING MATERIAL USING THE SAME

FIELD OF THE INVENTION

The present invention relates to novel fluoran derivatives and a recording material using this fluoran derivative.

The fluoran compounds of the present invention are very useful as dye precursors for various kinds of recording materials, especially for pressure-sensitive papers, heat-sensitive papers and electro thermo-recording papers. Further, these compounds can be used in photosensitive recording sheets, ultrasonic wave recording sheets, electron beam recording sheets, electrostatic recording sheets, ink for ball-point pens, crayons and so on.

BACKGROUND OF THE INVENTION

Various fluoran derivatives are already well-known and are used as dye precursors for pressure-sensitive papers or heat-sensitive papers, e.g., as disclosed in U.S. Pat. No. 3,825,432; West German Patent Application (OLS) No. 2,262,127; and Japanese Patent Publication (examined) No. 38245/76. None of the dye images obtained from these known fluoran derivatives are pure black and these known fluoran compounds suffer from the defect that they themselves are unstable in the atmosphere, produce dyes with inferior fastness to light, moisture, etc., and so on.

SUMMARY OF THE INVENTION

Therefore, a first object of the present invention is to provide novel fluoran derivatives which have excellent capability as dye precursors, especially for black color-forming type recording materials.

The above-described object is attained with a fluoran derivative with an arylamino group at the 2-position, a long-chain alkyl group at the 3-position of the fluoran ring and an amine residue at the 6-position of the fluoran ring.

In particular, the fluoran derivative of the present invention is highly soluble in oils and consequently, heat-sensitive recording materials containing this fluoran derivative have excellent properties in generating only a slight background coloration and hardly exhibit any increase in fog density upon storage and a decrease in color forming ability with the lapse of time.

DETAILED DESCRIPTION OF THE INVENTION

The fluoran derivatives of the present invention are represented by the following general formula (I):

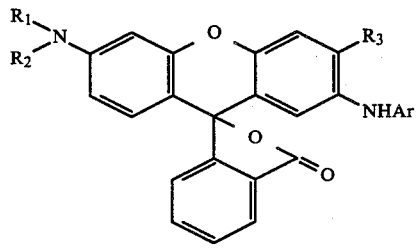
(I)

wherein $R_1$ represents a hydrogen atom, an alkyl group ($C_1$ to $C_{10}$), a halogen atom or alkoxy substituted alkyl group ($C_1$ to $C_{10}$), an alkenyl group ($C_3$ to $C_6$) or an aryl group ($C_6$ to $C_{10}$), $R_2$ represents an alkyl group ($C_1$ to $C_{10}$), a halogen atom or alkoxy substituted alkyl group ($C_1$ to $C_{10}$) or an alkenyl group ($C_3$ to $C_6$), $R_3$ represents a long-chain alkyl group, Ar represents an aryl group, and $R_1$ and $R_2$ may combine to each other to form 5 to 7 membered ring.

Preferable examples of fluoran compounds represented by the general formula (I) of the present invention include those having at the 2-poistion, an arylamino group, especially an arylamino group having 6 to 8 carbon atoms such as an anilino group, a p-methylanilino group or a p-chloroanilino group, from the standpoint of exhibiting a black hue, at the 3-position, a long-chain alkyl group, preferably an alkyl group which has 8 to 18 carbon atoms in total, and more particularly a long-chain alkyl group having 8 to 16 carbon atoms such as an octyl group, a nonyl group, a decyl group, an undecyl group, a dodecyl group or a pentadecyl group, and, at the 6-position, an amine residue selected from amino groups with an alkyl group, an alkenyl group, an aryl group or/and an aralkyl group as a substituent, with specific examples including, a dioctylamino group, a dihexylamino group, an N-methyl-p-toluidino group, an N-methylcyclohexylamino group, a pyrrolidino group, a diarylamino group, a diallylamino group, a piperidino group, a dibutylamino group, a diethylamino group, a dimethylamino group, an N-ethylanilino group, an N-methylanilino group, an N-benzylanilino group, a hexamethyleneimino group, a di-β-ethoxyethylamino group, an N-benzyl-p-toluidino group, etc.

The fluoran derivative of the present invention is characterized by markedly low solubility in water and further, a low melting point, which is due to the presence of a long-chain alkyl group at the 3-position of the fluoran ring. Further, the introduction of an arylamino group, especially an anilino group, a p-methylanilino group or a p-chloroanilino group, at the 2-position of the fluoran ring contributes to the formation by the fluoran derivative of a color with a pure black hue due to the interaction with a color developing agent having a phenolic hydroxyl group.

On the other hand, a skeleton and a kind of an amine residue present at the 6-position do not particularly importantly influence the formation of a color with a black hue. However, amine residues having 4 or more, preferably 6 or more, carbon atoms are excellent in that the resulting fluoran compounds can be dissolved in organic solvents with high concentrations.

In the above-described fluoran derivatives used in the present invention, the fluoran derivatives having the following general formula (II) are more preferred:

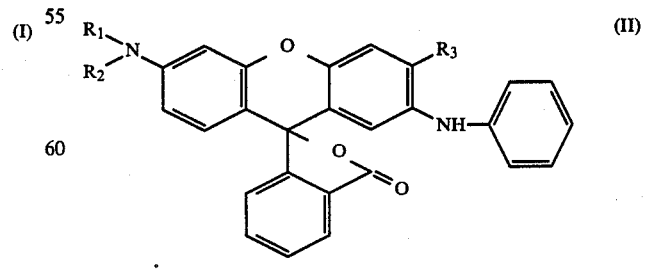
(II)

wherein substituents $R_1$ and $R_2$, which may be same or different, each represents a halogen atom or alkoxy substituted alkyl group ($C_1$ to $C_{10}$) or an unsubstituted alkyl group ($C_1$ to $C_{10}$) and $R_3$ represents a long-chain alkyl group ($C_8$ to $C_{16}$).

All of the fluoran compounds of the present invention are novel compounds and are obtained as colorless or light-colored crystals. They possess the advantages that their hydrophobic properties are remarkably high, their solubilities in organic solvents are high and they rapidly form a black color on contact with electron accepting substances. The dyes formed therefrom are highly stable when compared with dyes produced from conventional color formers, and hardly undergo any change in color and discoloration even when they are exposed to light, heat or/and moisture for a long period of time. Accordingly, the dyes formed from the fluoran compounds of the present invention can be advantageously used in materials for records which are to be kept for a long time. Also, the fluoran compounds of the present invention have excellent stability as a color former, that is to say, they do not undergo any change in quality and do not form a coloration even after long period of storage, and have sufficient color forming abilities. Therefore, they have almost ideal properties as color formers for recording materials such as pressure-sensitive papers, heat-sensitive papers, and so on.

Typical examples of fluoran derivatives of the present invention include:

(1) 2-p-Chloroanilino-3-pentadecyl-6-diethylaminofluoran,
(2) 2-p-Chloroanilino-3-pentadecyl-6-dibutylaminofluoran,
(3) 2-Anilino-3-pentadecyl-6-dihexylaminofluoran,
(4) 2-p-Chloroanilino-3-pentadecyl-6-dioctylaminofluoran,
(5) 2-Anilino-3-dodecyl-6-N-methyltoluidinoaminofluoran,
(6) 2-p-Chloroanilino-3-octyl-6-N-hexylaminofluoran,
(7) 2-Anilino-3-decyl-6-diarylaminofluoran,
(8) 2-Anilino-3-pentadecyl-6-dimethylaminofluoran,
(9) 2-p-Chloroanilino-3-pentadecyl-6-dimethylaminofluoran,
(10) 2-Anilino-3-pentadecyl-6-N-ethyl-isoamylaminofluoran, or
(11) 2-Anilino-3-pentadecyl-6-N-ethyl-γ-methoxypropylaminofluoran and the like.

Processes for synthesizing the fluoran derivatives of the present invention and synthesis examples thereof are illustrated below.

Although the fluoran derivatives of the present invention can be synthesized by various processes as described in, for example British Pat. No. 2,066,835, the following three processes can be used as the representatives processes.

(1) One process comprises conducting a condensation reaction between a 2-hydroxy-4-(substituted-amino)-2'-carboxybenzophenone and a 2-(long-chain-alkyl)-4-alkoxy-4'-arylaminoaniline in the presence of an acid catalyst.

(2) A second process comprises conducting an arylation by reacting a 2-amino-3-(long-chain-alkyl)-6-substituted-aminofluoran with an aryl halide, e.g., bromobenzene, p-chlorobromobenzene, dichlorobenzene or iodobenzene, in the presence of a copper catalyst.

(3) A third process comprises conducting an arylation by reacting 2-acylamino-3-(long-chain-alkyl)-6-substituted-aminofluoran with an aryl halide, e.g., bromobenzene, p-chlorobromobenzene or iodobenzene, in the presence of a copper catalyst, and conducting a saponification reaction with an alkali.

Suitable examples of acid catalysts which can be used in process (1) include Lewis acids such as zinc chloride, aluminium chlorode, magnesium chloride, calcium chloride and the like; and Bronsted acids such as sulfuric acid, p-toluenesulfonic acid, methanesulfonic acid and the like.

Processes (2) and (3) involve the reaction of a 2-aminofluoran and a 2-acylaminofluoran derivative, respectively, with an arylating agent in the presence of a catalyst. Suitable examples of catalysts which can be used in these processes include copper powder, copper compounds such as copper oxides, cuprous iodide, cupric iodide, etc., nickel compounds, cobalt compounds and so on. Of these catalysts, copper powder is a particularly advantageous catalyst. Further, these catalysts are preferably used in combination with iodine, carbonates or magnesia.

In addition, a 2-(long-chain-alkyl)-4-alkoxy-4'-arylaminoaniline to be employed in process (1) can be obtained by using the following synthesizing processes. For instance, one process comprises the reaction of a 2-(long-chain-alkyl)-4-methoxyaniline or the acetoanilide thereof with (a) an aryl halide, e.g., bromobenzene, p-dichlorobenzene, aniline hydrochloride, etc., or an arylamine salt, or (b) a 2-carboxyaryl balide; another process comprises the reaction of a 2-(long-chain-alkyl)-4-methoxychlorobenzene or 2-(long-chain-alkyl)-4-methoxybromobenzene with an arylamine or its formyl or acetyl derivative; and so on. These are known methods for diarylamine synthesis.

Specific examples of the syntheses of the fluoran derivative of the present invention are shown below. Unless otherwise indicated, all parts percents, ratios and the like are by weight.

SYNTHESIS EXAMPLE 1

(i) Synthesis of 4-Acetoamino-3-pentadecylphenol 250 ml of tetrahydrofuran and 0.11 mole of 4-amino-3-pentadecylphenol were weighed out and placed in a flask equipped with a stirrer. Thereto, 0.13 mole of acetic anhydride dissolved in 25 ml of tetrahydrofuran was slowly added dropwise, and the stirring was continued for 2 hours. The product was isolated in a conventional manner, and recrystallized from ethanol. Thus, 4-acetoamino-3-pentadecylphenol (mp 103°–105° C.) was obtained with an almost quantitative yield.

(ii) Synthesis of 4-Acetoamino-3-pentadecylanisole 0.02 mole of 4-acetoamino-3-pentadecylphenol produced as in (i) above was weighed out and dissolved in 50 ml of acetone-tetrahydrofuran (2:1 by vol) mixed solvent. Thereto, 0.022 mole of dimethyl sulfate was added. To the resulting mixture was further added 0.225 mole of a 50% water solution of sodium hydroxide under such a condition that the temperature of the mixture was kept at 40° to 60° C. After the addition, the reaction mixture was further stirred for a period of 30 minutes. Then, it was poured slowly into ice water, and recrystallized from ethanol. Thus, 4-acetoamino-3-pentadecylanisole (mp 103°–105° C.) was obtained with an almost quantitative yield.

(iii) Synthesis of 4-Methoxy-2-pentadecyl-diphenylamine 0.03 mole of 4-acetoamino-3-pentadecylanisole produced as in (ii) above, 0.036 mole of iodobenzene, 0.06 g of copper powder and 2.4 g of potassium carbonate were weighed out, and the mixture was heated to 220°–260° C. for 8 hours with stirring. Then, the reaction mixture was filtered, and the product recrystallized from ligroin to obtain 4-methoxy-2-pentadecyl-N-acetyldiphenylamine (mp 51°–52° C.).

The thus obtained product was hydrolyzed with potassium hydroxide in a conventional manner, and poured into ice water to yield 4-methoxy-2-pentadecyl-diphenylamine as crystals (mp 57°–58.5° C.).

(iv) Synthesis of
2-Anilino-3-pentadecyl-6-diethylaminofluoran

A mixture of 6.2 g of 2-(2-hydroxy-4-diethylamino)-benzoylbenzoic acid, 0.02 mole of 4-methoxy-2-pentadecyl-diphenylamine produced as in (iii) above and 15 ml of concentrated sulfuric acid (98%) was stirred at a temperature of 40° to 70° C. for 4 hours. After cooling, the reaction mixture was poured into ice water, neutralized with sodium hydroxide, and extracted with ethyl acetate. After the ethyl acetate solvent was distilled away from the extract, the residue was recrystallized from methanol to obtain 4.9 g of 2-anilino-3-pentadecyl-6-diethylaminofluoran.

This compound had a melting point of 121° to 122.5° C. and a molecular weight of 672 (MS), and exhibited a blackish-violet coloration on silica gel.

SYNTHESIS EXAMPLE 2

Synthesis of
2-Anilino-3-pentadecyl-6-dimethylaminofluoran

The synthesis procedures as described in Synthesis Example 1 were repeated except that 2-(2-hydroxy-4-dibutylamino)benzoylbenzoic acid was used in place of 2-(2-hydroxy-4-diethylamino)benzoylbenzoic acid, and 5.3 g of 2-anilino-3-pentadecyl-6-dimethylaminofluoran was obtained.

This compound was a slow-crystallizing, viscous liquid, and had a molecular weight of 644 (MS). Its molecular structure was confirmed by NMR measurement.

This compound exhibited a blackish-violet coloration on silica gel, and had Rf value of 0.60 when chromatographed over silica gel using as a developing solvent a carbon tetrachloride/acetone/acetonitrile (8.45/0.65/0.9 by volume) mixture.

SYNTHESIS EXAMPLE 3

Synthesis of
2-p-Chloroanilino-3-pentadecyl-6-diethylaminofluoran

The synthesis procedures as described in Synthesis Example 1 were repeated except that 4-p-chloroanilino-3-pentadecylanisole was used in place of 4-acetoamino-3-pentadecylanisole, and 5.2 g of 2-p-chloroanilino-3-pentadecyl-6-diethylaminofluoran was obtained.

This product was a slow-crystallizing, viscous liquid, and had a molecular weight of 706 (MS). Its molecular structure was confirmed by NMR measurement. In addition, this compound showed single blackish-violet spot when chromatographed over silica gel using as a developing solvent a chloroform/ethyl acetate (9/1 by volume) mixture.

SYNTHESIS EXAMPLE 4

Synthesis of
2-Anilino-3-pentadecyl-6-N-ethyl-p-toluidinofluoran 0.02 mole of 2-(2-hydroxy-4-N-ethyl-p-toluidino)benzoylbenzoic acid was weighed out and dissolved in a mixture of 18 ml of concentrated sulfuric acid (98%) and 2 ml of fuming sulfuric acid. Thereto, 0.02 mole of 4-anilino-pentadecylanisole was added with stirring. Then, the mixture was heated to 40° to 60° C., and the stirring was continued for 3 hours at the same temperature. The reaction mixture thus obtained was neutralized with an aqueous solution of sodium hydroxide (10%) cooled previously with ice. The resulting precipitate was recrystallized from ligroin. Thus, 2-hydroxy-4-N-ethyl-p-toluidino-2'-methoxy-4'-pentadecyl-5'-anilinophthalide (mp: 132° C.–133° C., molecular weight: 766 (MS)) was obtained. Then, xylene was mixed, with this product in an amount equivalent (by volume) to this product. The mixture was heated for 3 hours and thereby, the titled fluoran was produced with the elimination of methanol. When this product was developed using silica gel as a support and a carbon tetrachloride-acetone mixture as a developing solvent, a black color was obtained on the silica gel.

This product was a slow-crystallizing, viscous liquid, and had a molecular weight of 734 (MS). When chromatographed over silica gel using as a developing solvent a carbon tetrachloride/acetone (9.5/0.5 by volume) mixture, this product showed an Rf value of 0.30.

The thus obtained fluoran color formers of this invention and phenol compounds (in practice, bisphenol A or β-benzyl-p-oxybenzoate is used) provided clear black color when in contact with each other in a heated condition.

Specific examples of processes for production of recording materials using the fluoran dye precursors of the present invention are illustrated below.

Pressure-sensitive papers using the fluoran dye precursors of the present invention can have various forms, as described in, e.g., U.S. Pat. Nos. 2,505,407; 2,505,471; 2,505,489; 2,548,366; 2,712,507; 2,730,456; 2,730,457; 3,418,250; 3,418,250; 3,432,327; 3,981,821; 3,993,831; 3,996,156; 3,996,405; 4,000,087: and so on. Specifically, the fluoran dye precursors of the present invention can be dissolved alone, in a form of mixture of two or more thereof, or together with other dye precursors in an appropriate solvent (e.g., synthetic oils such as alkylated naphthalene, alkylated diphenyl, hydrogenated styrene dimer, diphenyl alkane, alkylated terphenyl, chlorinated paraffin, etc.; vegetable oils such as soybean oil, castor oil, etc.; animal oils; mineral oils; and mixtures of these oils). The resulting solution is dispersed into a binder or encapsulated in microcapsules and then, coated on a support, e.g., paper, a synthetic resin sheet, a synthetic resin-coated paper or the like. This results in preparation of a pressure-sensitive paper. The fluoran dye precursors of the present invention have the advantage that they can be dissolved in solvents, especially the above-described solvents, with high concentrations.

Since the appropriate amount of the dye precursor in a pressure-sensitive paper changes depending on the desired thickness of the coated film, the form of the pressure-sensitive paper, the method of preparing microcapsules and other conditions, the actual amounts need to be determined experimentally. Encapsulation of the dye precursor in microcapsules can be effected by using a method which takes advantage of the coacervation of a hydrophilic colloid sol, as described in U.S. Pat. Nos. 2,800,457 and 2,800,458: an interfacial polymerization method, as described in British Pat. Nos. 867,797; 950,443 and 1,091,076: and so on.

Suitable examples of electron accepting substances which can be used to develop and form a color in the fluoran compound of the present invention include inorganic substances such as acid clay, calcined acid clay, zinc chloride, zinc thiocyanate, etc.; mono- or poly-hydricphenols such as phenylphenol, bisphenol A, chlorobisphenol B, α-benzyl-β-naphthol, dihydroxybiphenyl, methylenebis-4-chlorophenol, bisphenol S, 2,2'-bishydroxyphenylsulfone, 1,1-bis-4-hydroxyphenylcyclohexane, 4-α-carboxybenzylphenol, 4,4'-dihydroxybenzophenone, zinc p-hydroxybenzenesulfonate, benzyl 4-hydroxybenzoate, m-chlorobenzyl 4-hydroxybenzoate, β-phenethyl 4-hydroxybenzoate, etc.; salicylic acid derivatives such as zinc 3,5-di-t-octylsalicylate, zinc 5-dodecylsalicylate, zinc isopropylsalicylate, zinc 3,5-di-α-methylbenzylsalicylate, zinc 3,5-di-α,α-dimethylbenzylsalicylate, zinc methylenebissalicylate, etc.; and so on. These substances are described in detail in the above-described patents.

A general used process for the preparation of heat-sensitive paper using the fluoran dye precursor of the present invention is illustrated below.

To a liquid prepared by dissolving or dispersing a binder in a solvent or a dispersion medium, respectively, were admixed the fluoran dye precursor, an electron accepting substance and a heat fusible substance (which is employed when the dye precursor or the electron accepting substance does not melt at a desired temperature). The resulting mixture is milled finely and thoroughly and then, coated on a support, e.g., paper, a synthetic resin sheet, a resin-coated paper, etc., followed by drying. Thus, a heat-sensitive paper is obtained. The preparation of the mixed solution may be carried out by mixing previously all of the components at the same time and then, milling the mixture; or by combining appropriately some of the components, milling each combination and then, mixing the combinations.

Further the coating composition may be incorporated into a support when the support is produced if desired.

In addition, an opacity imparting agent may be admixed during preparation of the above-described mixture.

A coating composition for preparing a heat-sensitive paper preferably comprises 1 to 2 parts by weight of the fluoran dye precursor, 1 to 6 parts by weight of an electron accepting substance, 0 to 30 parts by weight of a heat fusible substance, 0 to 15 parts by weight of a pigment, 1 to 15 parts by weight of a binder and 20 to 300 parts by weight of a dispersion medium (or a solvent).

The fluoran compounds of the present invention may be employed alone as the dye precursor, in a mixture of two or more thereof, or in a mixture with conventional color formers known to be suitable for pressure-sensitive papers, e.g., Crystal Violet lactone, fluoran derivatives other than those of the present invention, etc. Organic acids and the metal salts thereof are particularly advantageous as electron accepting substances among those described hereinbefore. Water is the preferred the dispersion medium (or solvent).

Specific examples of binders which can be used with the fluoran dye precursors of the present invention include styrene-butadiene copolymers, alkyd resins, acrylamide copolymers, vinyl chloride-vinyl acetate copolymers, styrene-maleic anhydride copolymers (latexes), synthetic rubbers, gum arabic, polyvinyl alcohol, hydroxyethyl cellulose, etc.

Gum arabic, polyvinyl alcohol, hydroxymethyl cellulose, carboxymethyl cellulose and like water soluble binders are particularly desirable as binders in relation to the dispersion medium (solvent) used preferably.

Suitable examples of heat fusible substances which can be used include stearic acid amide, erucic acid amide, oleic acid amide, stearic acid anilide, ethylenebisstearoamide, benzoin, α-naphtholbenzoate, β-naphtholbenzoate, p-methylbenzoate, p-t-butylphenolphenoxyacetate, p-phenylphenol p-chlorophenoxyacetate, 4,4'-cyclohexylidenediphenol diacetate, 4,4'-isopropylidenediphenol dimethyl ether, β-phenylethyl-p-phenylphenol ether, phthalic anhydride, maleic anhydride, stearic acid, erucic acid, palmitic acid, p-hydroxybenzoic acid methyl ester, β-naphthol benzyl ether, phthalic acid di-phenyl ester, triphenyl phosphate, hydroxydiphenyl methyl ether, 2,2-bis[4-(β-hydroxyethoxy)phenyl]propane, p-bis(β-hydroxydiethoxy)benzene, hydroquinone diacetate, β-naphthol-m-chlorobenzyl ether, β-naphthol phenoxyacetate, phenylphenol benzyl ether and so on. These substances may be employed alone or as a mixture of two or more thereof.

These substances are colorless solids at ordinary temperature, and have sharp melting points in the vicinity of temperatures suitable for heating in conventional copying devices, specifically in the vicinity of about 70° to 160° C. Moreover, these substances, when in a molten condition, can dissolve at least either of the above-described fluoran dye precursor or electron accepting substances, desirably both of them.

Electro thermo-recording paper using the fluoran dye precursors of the present invention can be prepared by reference to the method disclosed in Japanese Patent Publications (unexamined) Nos. 11344/74 and 48930/75. Specifically, a coating composition prepared by suspending or dispersing a conductive substance, the fluoran dye precursor and an electron accepting substance together with a binder in a dispersion medium such as water is coated on a support such as paper or so on; or a conductive layer is formed on a support by coating a conductive substance thereon, and then, a dispersion prepared by dispersing the fluoran dye precursor and an electron accepting substance together with a binder into water or the like is coated on the conductive layer. When both of the dye precursor and the electron accepting substance used do not melt within a desired temperature range (generally about 70° to 130° C.), a heat fusible substance which melts within the desired temperature range and which dissolve at least either the fluoran dye precursor or the electron accepting substance used should be employed. The use of such a heat fusible substance as described above enables the sensitivity to Joules heat generated by passing an electric current therethrough can be controlled.

As for the electron accepting substance and the heat fusible substance, those described as suitable for heat-sensitive recording papers can be used herein also.

A recording sheet using the fluoran dye precursor of the present invention can be prepared in the same manner as described in, e.g., Japanese Patent Publications (examined) Nos. 24188/63, 10550/70, 13258/70, 204/74, 6212/74 and 28449/74; Japanese Patent Publications (unexamined) Nos. 31615/72, 32532/73, 9227/74, 135617/74, 80120/75, 87317/75 and 126228/75; and so on, except that the fluoran derivative of the present invention is employed in place of the dye precursors employed in those patents, e.g., lactone compounds, lactam compounds, spiropyran compounds, carbinol compounds, ethylene compounds, leuco Auramine compounds, oxazine compounds and so on.

Other recording materials also can be prepared by using the fluoran derivative of the present invention in place of conventional dye precursors.

The following examples are given to illustrate further uses of the fluoran dye precursors of the present invention. Again, unless otherwise indicated, all parts, percents, ratios and the like are by weight.

APPLICATION EXAMPLE 1

In 15 parts by weight of β-isopropylphenylethylbenzene, 1 part of the above-described dye precursor of the present invention (the compound produced in Synthesis Example 2) was dissolved. This solution was added with vigorous stirring to 50 parts of water in which 6 parts of gelatin and 4 parts of gum arabic were dissolved previously and thereby, emulsification was achieved to produce oil droplets having a diameter of 4 to 6μ. Then, 250 parts of water was added to the emulsion. The pH of the resulting emulsion was adjusted to about 4 by adding acetic acid in small amounts thereto in order to achieve coacervation. Thus, a wall of gelatin and gum arabic was formed around the oil droplets. This wall was hardened by adding formaldehyde and then, by increasing the pH of the emulsion to 9.

The thus obtained microcapsule dispersion was coated onto a paper support and dried. The resulting paper support was placed in face-to-face contact with a paper coated with one or more acidic organic substance, specifically a phenol resin, 4,4'-isopropylidenediphenol, zinc 3,5-di(α-methylbenzyl)-salycilate, p-hydroxybenzoic acid benzyl ester, zinc p-toluenesulfonate, 2,2'-methylenebis-p-chlorophenol and so on independently or in combination of two or more thereof, and a pressure was applied thereto. A black image was obtained the moment the pressure was applied thereto. This image exhibited high density and markedly excellent water resistance properties.

APPLICATION EXAMPLE 2

Another microcapsule-coated paper was prepared in the same manner as described in Example 1 except that the compound produced in Synthesis Example 4 was used as a dye precursor in place of the dye precursor used in Example 1 and further, 1,1-ditolylethane was used as the solvent. The thus obtained pressure-sensitive paper formed color instantly with high density, and the characters developed had extremely excellent water resistance property, light resistance property and heat resistance property.

APPLICATION EXAMPLE 3

A dispersion was prepared by milling 20 parts of the above-described dye precursor of the present invention (the compound produced in Synthesis Example 1) and 15 parts of 2-anilino-3-methyl-6-dibutylaminofluoran together with 150 parts of a 10% aqueous solution of polyvinyl alcohol and 70 parts of water using a sand mill. The particle size after milling was about 1 micron. (Component A)

Separately, another dispersion was prepared by mixing and milling 30 parts of bisphenol A, 30 parts of stearic acid anisidide, 150 parts of a 10% aqueous solution of polyvinyl alcohol and 55 parts of water using a sand mill. The particle size after milling was about 2 micron. (Component B)

Then, 5 parts of Component A and 40 parts of Component B were mixed, coated on a paper support and dried. Thus, a heat-sensitive paper was obtained.

A black color was formed on this heat-sensitive paper when heated with a hot-pen or the like. Also, black images copied were obtained by superposing an original upon this heat-sensitive paper and heating the assembly with a heat-sensitive copying machine. The color image obtained was markedly stable to moisture, and hardly changed when stored at a temperature of 40° C. under a humidity of 95% RH for 16 hours. In addition, this image was very stable to light, and its hue and density hardly changed even with one hour's irradiation with an ultraviolet lamp.

APPLICATION EXAMPLE 4

The phthalide produced in Synthesis Example 4 was put on a silica gel plate, and as soon as this plate was placed on a 160° C. iron plate, a black color was developed.

While the invention has been described in detail and with reference to specific embodiments thereof, it will be apparent to one skilled in the art that various changes and modifications can be made therein without departing from the spirit and scope thereof.

What is claimed is:

1. A recording material comprising a support and a fluoran derivative represented by the following general formula (II):

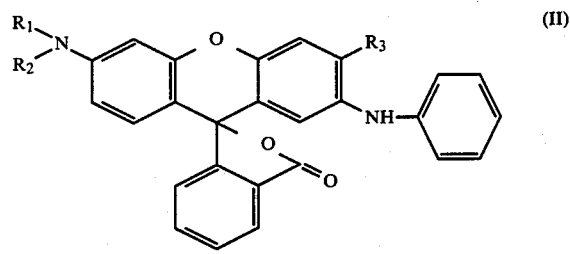

wherein $R_1$ and $R_2$, which may be the same or different, each represents a halogen atom or alkoxy substituted alkyl group having 1 to 10 carbon atoms or an unsubstituted alkyl group having 1 to 10 carbon atoms and $R_3$ represents a long chain alkyl group having 8 to 16 carbon atoms.

2. The recording material as in claim 1, wherein said recording material is a heat-sensitive recording material comprising a support having thereon the fluoran derivative, an electron accepting substance and a heat fusible substance dispersed in a binder.

3. The recording material as in claim 1, wherein said recording material is an electro thermo-recording material comprising a support having thereon an electrically conductive substance, the fluoran derivative and an electron accepting substance dispersed in a binder.

4. The recording material as in claim 1, wherein said recording material is an electro thermo-recording material comprising a support, which is electrically conductive or has coated thereon an electrically conductive substance, and further has thereon the fluoran derivative and an electron accepting substance dispersed in a binder.

5. The recording material as in claim 1, wherein said recording material is a pressure-sensitive copying material comprising a support having thereon a dispersion of microcapsules containing the fluoran derivative dissolved in a solvent dispersed in a binder.

* * * * *